(12) United States Patent
Ahn et al.

(10) Patent No.: US 8,205,256 B2
(45) Date of Patent: Jun. 19, 2012

(54) APPARATUS FOR DETECTING INTRUSION CODE AND METHOD USING THE SAME

(75) Inventors: Tae Jin Ahn, Seoul (KR); Taejoon Park, Seoul (KR); Tae-Chul Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 11/874,348

(22) Filed: Oct. 18, 2007

(65) Prior Publication Data

US 2008/0184369 A1  Jul. 31, 2008

(30) Foreign Application Priority Data

Jan. 31, 2007 (KR) .................. 10-2007-0010300

(51) Int. Cl.
*H04L 29/06* (2006.01)
(52) U.S. Cl. ........................................ 726/22
(58) Field of Classification Search .................. None
See application file for complete search history.

(56) References Cited

U.S. PATENT DOCUMENTS

| | | | | |
|---|---|---|---|---|
| 7,093,239 B1 * | 8/2006 | van der Made | | 717/135 |
| 7,636,945 B2 * | 12/2009 | Chandnani et al. | | 726/24 |
| 7,739,740 B1 * | 6/2010 | Nachenberg et al. | | 726/25 |
| 2002/0078368 A1 * | 6/2002 | Yann et al. | | 713/200 |
| 2002/0194489 A1 * | 12/2002 | Almogy et al. | | 713/200 |
| 2004/0064737 A1 * | 4/2004 | Milliken et al. | | 713/201 |
| 2004/0111632 A1 * | 6/2004 | Halperin | | 713/200 |
| 2006/0161987 A1 * | 7/2006 | Levy-Yurista | | 726/24 |
| 2007/0094734 A1 * | 4/2007 | Mangione-Smith et al. | | 726/24 |
| 2007/0143848 A1 * | 6/2007 | Kraemer et al. | | 726/23 |
| 2008/0134336 A1 * | 6/2008 | Rihn et al. | | 726/24 |
| 2010/0064368 A1 * | 3/2010 | Stolfo et al. | | 726/24 |
| 2010/0071061 A1 * | 3/2010 | Crovella et al. | | 726/23 |

FOREIGN PATENT DOCUMENTS

| | | |
|---|---|---|
| JP | 9-502550 A | 3/1997 |
| JP | 11-167487 A | 6/1999 |
| JP | 2004-362491 A | 12/2004 |
| KR | 10-2003-0087195 A1 | 11/2003 |
| KR | 10-2004-0080845 A | 9/2004 |
| KR | 10-2004-0090373 A | 10/2004 |
| WO | 95/02293 A1 | 1/1995 |

OTHER PUBLICATIONS

Japanese Office Action issued on Oct. 12, 2010 in counterpart Japanese Patent Application No. 2007-293641.

* cited by examiner

*Primary Examiner* — Nathan Flynn
*Assistant Examiner* — Michael R Vaughan
(74) *Attorney, Agent, or Firm* — Sughrue Mion, PLLC

(57) ABSTRACT

An apparatus and method of detecting an intrusion code is provided. The apparatus for detecting an intrusion code includes: a set value input unit in which a set value differentiated for each group is input; an immune database generation unit which generates an immune database, based on the set value; and an intrusion code determination unit which determines whether data corresponds to an intrusion code, based on the generated immune database.

21 Claims, 9 Drawing Sheets

APPARATUS FOR DETECTING INTRUSION CODE AND METHOD USING THE SAME

CROSS-REFERENCE TO RELATED APPLICATION

This application claims priority from Korean Patent Application No. 10-2007-0010300, filed on Jan. 31, 2007, in the Korean Intellectual Property Office, the entire disclosure of which is incorporated herein by reference.

BACKGROUND OF THE INVENTION

1. Field of the Invention

Methods and apparatuses consistent with the present invention relate to intrusion code detection, and more particularly, to establishing an individual feature for each computer, and detecting whether data corresponds to an intrusion code using a differentiated immune database.

2. Description of Related Art

As wired/wireless communication using a computer has developed, malicious codes such as viruses, worms, trojan horses, spam, hacking tools, and the like have become widespread, requiring technologies for preventing and detecting the spread of these malicious codes.

A related art technology of detecting a malicious code stores a signature corresponding to the malicious code, as a database, and detects the malicious code included in data by detecting the signature stored in the database.

However, since the related art technology of detecting the malicious code cannot detect all existing malicious codes, when a new type or a variety of a malicious code is distributed to a plurality of computers, the malicious code is either uniformly detected by the computers or uniformly infects the computers.

Specifically, when a computer is infected by the distributed malicious code, and the malicious code infecting the computer is distributed to a second computer, the second computer is also infected. Accordingly, all computers coming into contact with the malicious code are identically infected. On the other hand, if the malicious code can be detected in a particular computer, the malicious code can be detected in all computers.

As described above, the related art technology of detecting the malicious code has a problem in that the malicious code in all computers is identically detected when a detectable malicious code is contacted, and all computers are identically infected when an undetectable malicious code is contacted, since a database detecting the malicious code is identically configured in all computers.

Accordingly, an apparatus, which can prevent uniform detection of a malicious code, and uniform infection due to the malicious code, and have tolerance to the malicious code in a partial system, is required.

SUMMARY OF THE INVENTION

The present invention provides an apparatus and method of detecting an intrusion code, which can differentiate and generate an immune database which can determine whether data corresponds to an intrusion code.

The present invention also provides an apparatus and method of detecting an intrusion code, which can prevent uniform damage due to a new type or variety of a malicious code using a differentiated immune database.

The present invention also provides an apparatus and method of detecting an intrusion code, which can acquire a diagnostics method with respect to a new type or a variety of a malicious code from a system in which tolerance to the new type or the variety of the malicious code is induced.

According to an aspect of the present invention, there is provided an apparatus for detecting an intrusion code, the apparatus including: a set value input unit in which a set value differentiated for each group of at least one computer is input; an immune database generation unit which generates an immune database, based on the set value; and an intrusion code determination unit which determines, based on the generated immune database, whether data corresponds to an intrusion code.

The set value input into the set value input unit may include, a group feature key which divides a group, a resident code list corresponding to a secure code, and a random pool generation factor which generates a pool of the immune database.

The immune database generation unit may include: a feature extraction unit which extracts features of the resident code using the group feature key; a pool feature generation unit which generates random pool features, based on the group feature key and the random pool generation factor; a similarity value calculation unit which calculates a similarity value of features of the extracted resident code, and the generated random pool features; and an immune database generation management unit which generates, into the immune database, features in which the calculated similarity value from among the random pool features is less than or equal to a predetermined threshold value.

The pool feature generation unit generates the random pool features based on a length of the group feature key, and a random pool size included in the random pool generation factor.

The intrusion code determination unit may include: a data feature extraction unit which extracts features of the data using the group feature key; a data similarity value calculation unit which calculates a similarity value of the extracted features of the data, and features of the immune database; and an intrusion code determination management unit which determines the data as an intrusion code when the calculated similarity value is greater than a predetermined threshold value.

The intrusion code determination unit may further comprise: a data collection unit which collects data for determining the intrusion code, and the data feature extraction unit extracts features of each of the collected data.

The intrusion code determination unit determines whether any internally-stored execution file data corresponds to an intrusion code, based on the generated immune database.

The intrusion code determination unit also determines whether data input in real time corresponds to an intrusion code, based on the generated immune database.

According to another aspect of the present invention, there is provided a method of detecting an intrusion code, the method including: inputting of a set value differentiated for each group; generating an immune database, based on the set value; and determining whether data corresponds to an intrusion code, based on the generated immune database.

The set value may include a group feature key which divides a group, a resident code list corresponding to a secure code, and a random pool generation factor which generates a pool of the immune database.

The generating the immune database may include: extracting features of the resident code using the group feature key; generating random pool features, based on the group feature key and the random pool generation factor; calculating a similarity value of features of the extracted resident code, and the generated random pool features; and generating, in the immune database, features in which the calculated similarity value from among the random pool features is less than or equal to a predetermined threshold value.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
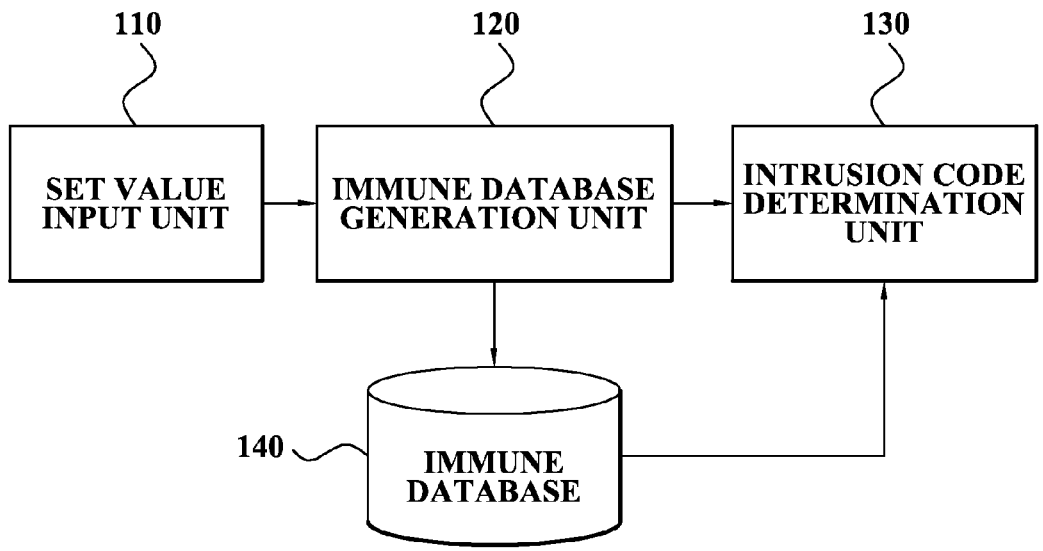
FIG. 1 is a block diagram illustrating a configuration of an apparatus for detecting an intrusion code according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a configuration of an apparatus for detecting an intrusion code according to an exemplary embodiment of the present invention.

The apparatus for detecting the intrusion code includes a set value input unit 110, an immune database generation unit 120, and an intrusion code determination unit 130.

A set value differentiated for each group of at least one computer is input in the set value input unit 110.

The set value includes a group feature key which divides a group, a resident code list corresponding to a secure code, and a random pool generation factor, which generates a pool of the immune database.

The group feature key is used for extracting features of a resident code for generating the immune database, or extracting features of data for determining whether data corresponds to an intrusion code. Specifically, features corresponding to a group feature key condition are extracted from the resident code, and the features corresponding to the group feature key condition are extracted from data for determining whether data corresponds to an intrusion code.

The group feature key may correspond to a pattern which is shown at predetermined probability, the probability ranging, for example, but not by way of limitation, from about $1/10$ to about $1/10000$, in a file processing a binary file or an original binary execution file. Specifically, the group feature key may correspond to a pattern which limits binary sequences acquired at predetermined probability from among the binary sequences having a predetermined length.

For example, when a group feature key corresponds to XXYX[YF]XX[LMIV], X is required to include any one of all patterns, [YF] is required to include any one of a Y pattern and an F pattern, and [LMIV] is required to include any one of an L pattern, an M pattern, an I pattern, and a V pattern.

Each pattern corresponds to mapping of a binary value depending on a predetermined unit and a predetermined rule. The binary value in which mapping with the pattern is performed may be changed, and a pattern in which mapping with the binary value is performed may also be changed.

For example, but not by way of limitation, if each pattern includes six bits according to the predetermined unit and the predetermined rule, the group feature key may include 48 bits, and a configuration of the Y pattern, the F pattern, the L pattern, the M pattern, the I pattern, and the V pattern may be determined by a manufacturer.

A resident code list may correspond to a program installed in a computer by a user, or a code list determined as secure from among execution codes.

The resident code list may also be manually established by the user, or be established using computer virus software for retrieving an execution file or examining security.

As described above, since the program and the execution file may be changed on an individual computer, the resident code list may be differently established, to correspond to a feature of each computer.

The random pool generation factor may include a factor which establishes a threshold value and a random pool size. The threshold value is used for generating the immune database or determining the intrusion code using the generated immune database.

The immune database generation unit 120 generates an immune database 140, based on the set value of the set value input unit 110.

The immune database generation unit 120 may extract features from each resident code included in the resident code list, and generate random pool features, based on the group feature key and the random pool generation factor.

Features of the resident code may be extracted using the group feature key.

The random pool features may be generated, based on a length of the group feature key, and a random pool size included in the random pool generation factor.

the immune database generation unit 120 calculates a similarity value of the features of the resident code, and the random pool features, and generates, into the immune database 140, features in which the calculated similarity value from among the random pool features is less than or equal to a predetermined threshold value.

A similarity value denotes a difference or similarity of two predetermined features. Specifically, calculating a similarity value numerically expresses the difference or similarity of the two features, and denotes the difference or similarity of the two features in which the calculated similarity value is numerically expressed.

A similarity value may be calculated using an Euclidean distance method, a Harmonic means method, a Matching coefficient method, a Dice coefficient method, a Cosine similarity method, a Levenshtein distance method, a Sellers algorithm method, a Smith-Waterman distance method, a Block distance method, and the like. A method of calculating a similarity value in this exemplary embodiment of the present invention is not limited to the above-described methods, and all methods of calculating a similarity value may be used.

As an example, but not by way of limitation, a similarity value of two strings using the Block distance method is described as follows.

When a string q is "ABCDEFGH", and a string r is "BCDEFGHG", a distance value between each element of two strings q and r is calculated using a block distance function, and, subsequently, a similarity value of the two strings is calculated by adding the calculated distance values. Specifically, a distance value between elements A of q, and B of r is calculated, and a distance value between elements B of q, and C of r is calculated using the block distance function. A process of calculating a distance value is performed to elements H of q, and G of r, and the similarity value of the two strings is calculated by adding all the calculated distance values.

The intrusion code determination unit 130 determines whether data corresponds to an intrusion code, based on the immune database 140 generated by the immune database generation unit 120.

The intrusion code determination unit 130 may collect data for determining whether the data corresponds to the intrusion code, and the collected data may be any of the execution file data stored in a computer, any data stored in the computer, and any data input into the computer in real time.

The data input into the computer in real time may, for example, correspond to a file downloaded using wired/wireless network shares, a file downloaded using a hypertext transport protocol/file transfer protocol (HTTP/FTP), a file downloaded using e-mails, a file downloaded using peer to peer (P2P) technology, a file downloaded from a storing apparatus, and the like.

The intrusion code determination unit 130 extracts features from the collected data, calculates a similarity value of the extracted features and features of the immune database 140, and determines the data as an intrusion code when the calculated similarity value is greater than a predetermined threshold value.

In this instance, the intrusion code determination unit 130 may extract features from the collected data based on the group feature key.

In the case where the collected data is a compressed file, the intrusion code determination unit 130 may extract the features after decompressing a file, and determine whether the data corresponds to the intrusion code.

Figure 2:
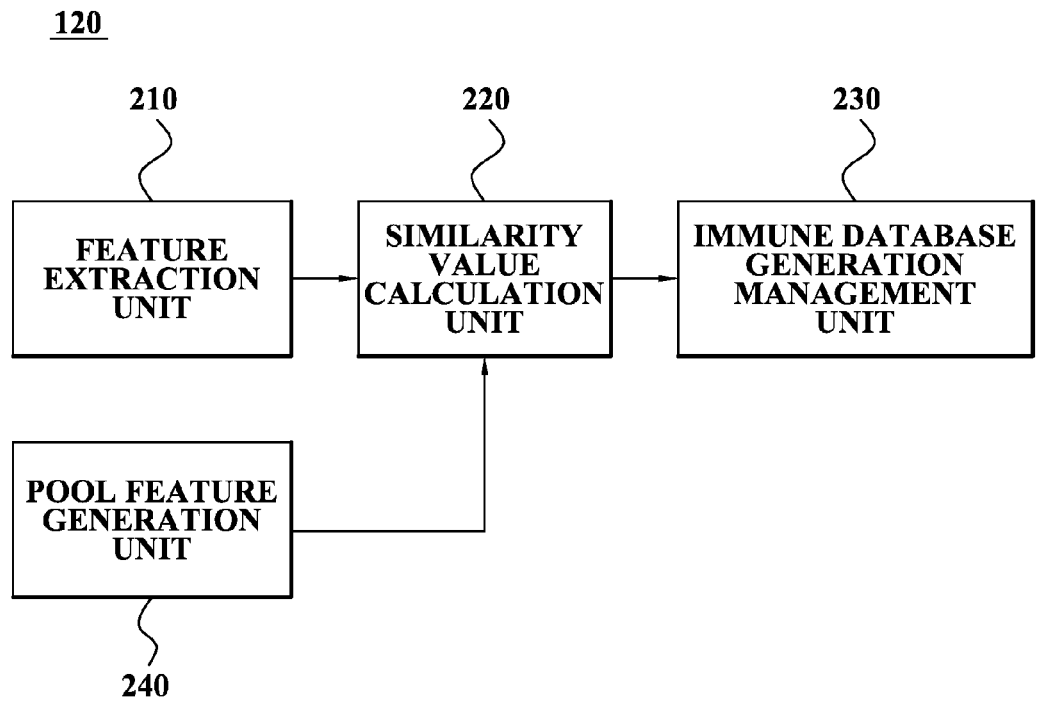
FIG. 2 is a block diagram illustrating a configuration of an immune database generation unit of FIG. 1.

FIG. 2 is a block diagram illustrating a configuration of the immune database generation unit 120 of FIG. 1.

The immune database generation unit 120 includes a feature extraction unit 210, a pool feature generation unit 240, a similarity value calculation unit 220, and an immune database generation management unit 230.

The feature extraction unit 210 extracts features of each resident code included in a resident code list using the group feature key.

The feature extraction unit 210 may read, from the resident code, a bit number corresponding to the group feature key, and extract features corresponding to a group feature key condition.

The pool feature generation unit 240 generates random pool features, based on the group feature key and the random pool generation factor.

The pool feature generation unit 240 may generate the random pool features, based on a length of the group feature key, and a random pool size included in the random pool generation factor.

For example, when a length of the group feature key is 48 bits and a random pool size is 1%, the pool feature generation unit 240 randomly generates $2^{48} \times 0.01$-number of random pool features.

The similarity value calculation unit 220 calculates a similarity value of features of the resident code, and the random pool features.

The immune database generation management unit 230 generates, into the immune database, features in which the calculated similarity value from among the random pool features is less than or equal to a predetermined threshold value.

The immune database generation management unit 230 may generate the immune database selecting the features which determine a resident code and an intrusion code from among the random pool features generated by the pool feature generation unit 240.

Accordingly, the features of the immune database generated by the immune database generation management unit 230 constantly have the calculated similarity value less than or equal to a threshold value when calculating the similarity value with respect to the features extracted from the resident code. The features of the immune database also have the probability that the calculated similarity value is greater than the threshold value when calculating the similarity value with respect to a code excluding the resident code.

Figure 3:
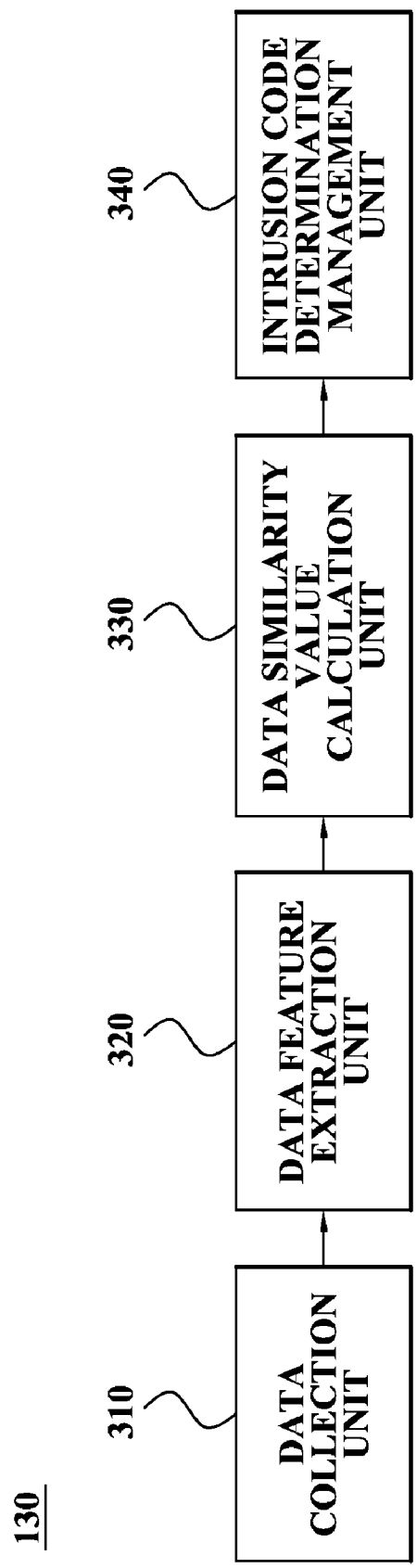
FIG. 3 is a block diagram illustrating a configuration of an intrusion code determination unit of FIG. 1.

FIG. 3 is a block diagram illustrating a configuration of the intrusion code determination unit 130 of FIG. 1.

The intrusion code determination unit 130 includes a data collection unit 310, a data feature extraction unit 320, a data similarity value calculation unit 330, and an intrusion code determination management unit 340.

The data collection unit 310 collects data for determining whether the data corresponds to the intrusion code.

In this instance, the data collection unit 310 may collect any one of all execution file data stored in a computer, all data stored in the computer, and data input into the computer in real time.

The data input into the computer in real time may correspond to a file downloaded using wired/wireless network shares, a file downloaded using a HTTP/FTP, a file downloaded using e-mails, a file downloaded using P2P technology, a file downloaded from a storing apparatus, and the like.

The data feature extraction unit 320 extracts features from the data collected using the group feature key. Specifically, the data feature extraction unit 320 extracts, from the collected data, features corresponding to a group feature key condition.

The data similarity value calculation unit 330 calculates a similarity value of features extracted from the collected data, and features of the immune database.

The intrusion code determination management unit 340 determines that the data is an intrusion code if the calculated similarity value is greater than a predetermined threshold value. Specifically, the intrusion code determination management unit 340 determines the data as a resident code if the calculated similarity value is less than or equal to the predetermined threshold value.

Operations of an apparatus for detecting an intrusion code according to an exemplary embodiment of the present invention illustrated in FIG. 1 are described in detail with reference to FIGS. 4 through 7.

Figure 4:
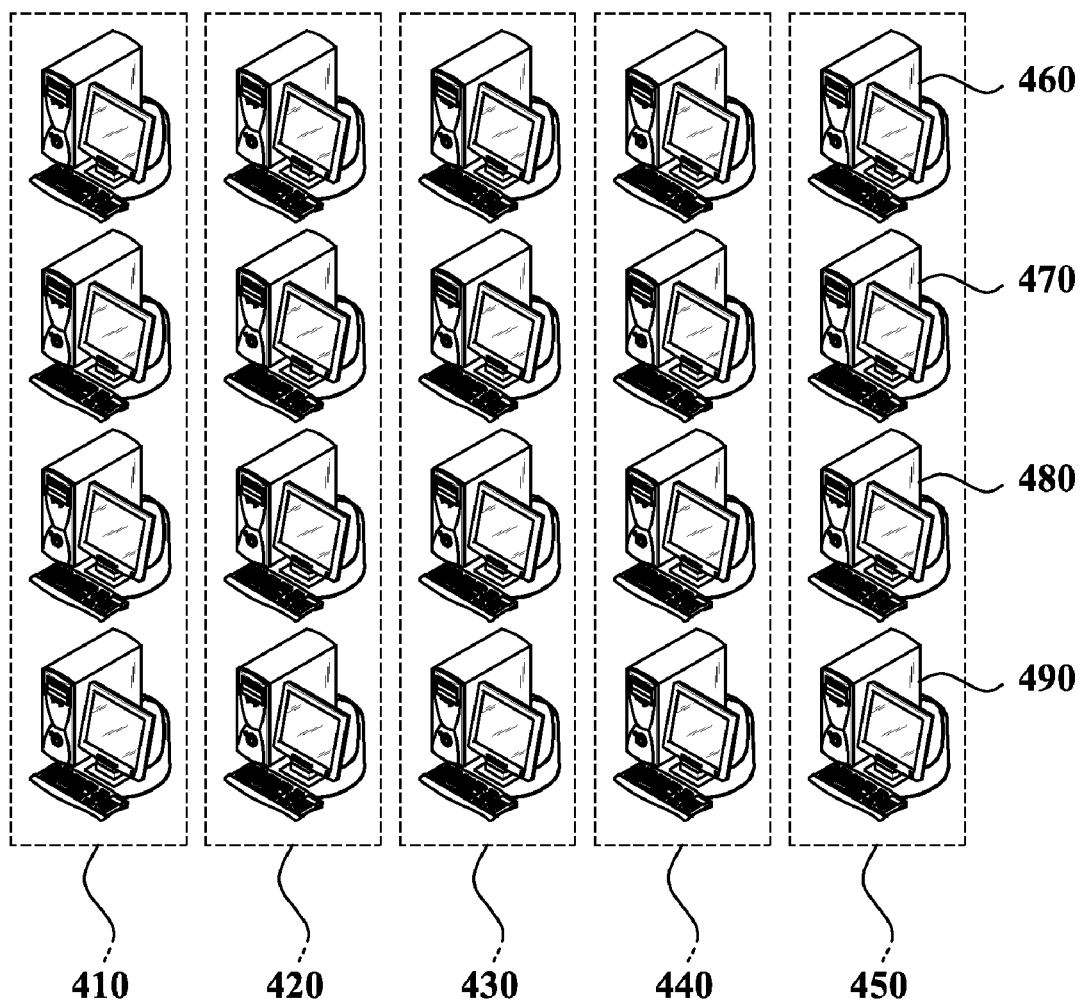
FIG. 4 is a diagram illustrating an example of a group for differently establishing a group feature key according to an exemplary embodiment of the present invention.

FIG. 4 is a diagram illustrating an example of a group for differently establishing a group feature key according to an exemplary embodiment of the present invention.

Different group feature keys are provided in each group 410 through 450. Specifically, different group feature keys are established for each group so that a unique immune database for determining a resident code and an intrusion code may be generated for each group.

Since each of a first computer through a fourth computer 460 through 490 included in a group 450 may include a different program installed in a computer, a resident code list may be different for each computer 460 through 490.

Also, a random pool generation factor may be differently established with respect to each computer. For example, a threshold value 2300 and a random pool size of 10% may be established for the first computer 460, a threshold value 2350 and a random pool size 1% may be established for the second computer 470, a threshold value 2400, and a random pool size 5% may be established for the third computer 480, and a threshold value 2500, and a random pool size 0.5% may be established for the fourth computer 490.

Specifically, a set value may be differently established so that different immune databases may be generated for each computer group and each computer included in the computer group illustrated in FIG. 4.

Figure 5:
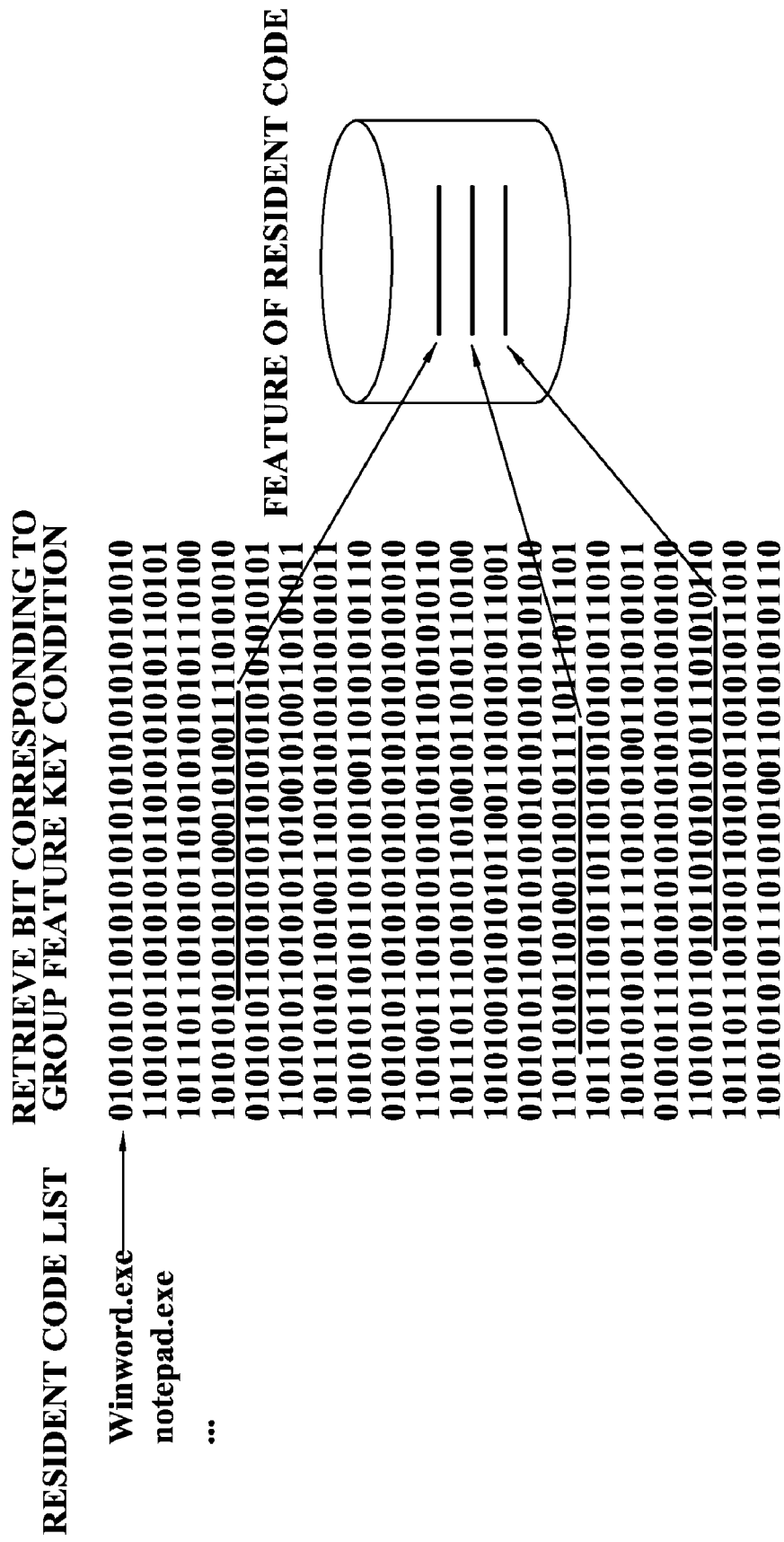
FIG. 5 is a diagram illustrating an example of extracting features from a resident code list established in each computer according to an exemplary embodiment of the present invention.

FIG. 5 is a diagram illustrating an example of extracting features from a resident code list established in each computer according to an exemplary embodiment of the present invention.

Resident codes included in a resident code list are collected from the resident code list included in each computer, and features are extracted from the collected resident codes.

Each computer may extract features from the resident codes by using a group feature key established for each computer group.

Specifically, each computer reads bits corresponding to group feature key bits from the resident code, determines whether a pattern corresponds to the established group feature key condition, and extracts the corresponding pattern into a feature when the pattern corresponds to the group feature key condition. Conversely, when the pattern is different from the group feature key condition, as few as one bit per pattern is transferred, and, subsequently, each computer determines whether the pattern corresponds to the group feature key condition.

Using the above-described process, features corresponding to the group feature key condition may be extracted from the resident codes.

Figure 6:
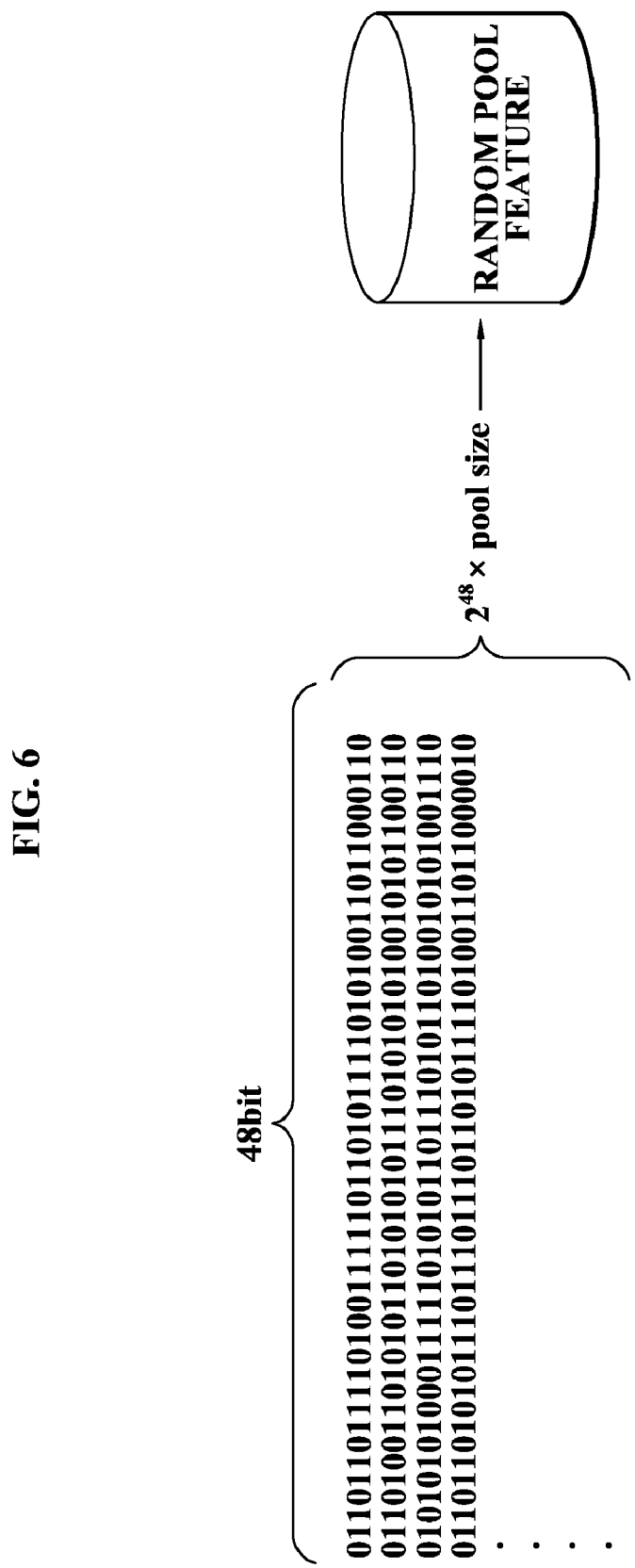
FIG. 6 is a diagram illustrating an example of generating random pool features according to an exemplary embodiment of the present invention.

FIG. 6 is a diagram illustrating an example of generating random pool features according to an exemplary embodiment of the present invention.

The random pool features are generated, using a length of the group feature key, and a random pool size established in each computer.

For example, when a length of the group feature key established in a first computer is 48 bits, and a random pool size is 10%, the number of randomly generated pool features is $2^{48} \times 0.1$. When a length of the group feature key established in a second computer is 48 bits, and a random pool size is 1%, the number of randomly generated pool features is $2^{48} \times 0.01$.

Partial features from among the generated random pool features may be selected as features of the immune database.

Specifically, a similarity value of features of the extracted resident codes and the random pool features is calculated, and the features in which the calculated similarity value from among the random pool features is less than or equal to a predetermined threshold value are generated into the immune database.

As described above, since group feature keys established for each group are different, immune databases generated among groups are different. Also, since a resident code list for each computer included in a group and a random pool generation factor may be differently established, different immune databases may be generated for each computer included in an identical group.

Accordingly, since an immune database generated in each computer is different, each computer may make different determinations regarding resident codes and intrusion codes.

Also, since the resident code and the intrusion code determined in each computer are different, all computers in a particular group are not infected by a malicious code, and only a portion of all the computers in the group will be infected. Accordingly, uniform damage due to a new type or a variety of a malicious code may be prevented, and a diagnostic method with respect to the new type or variety of the malicious code may be acquired from a computer in which tolerance to the new type or variety of the malicious code is induced. Specifically, the diagnostic method with respect to the new type or variety of the malicious code may be acquired by locating, from the damaged computer, a type of the malicious code, and acquiring, from the computer in which tolerance to the malicious code is induced, an immune pattern with respect to the malicious code.

Figure 7:
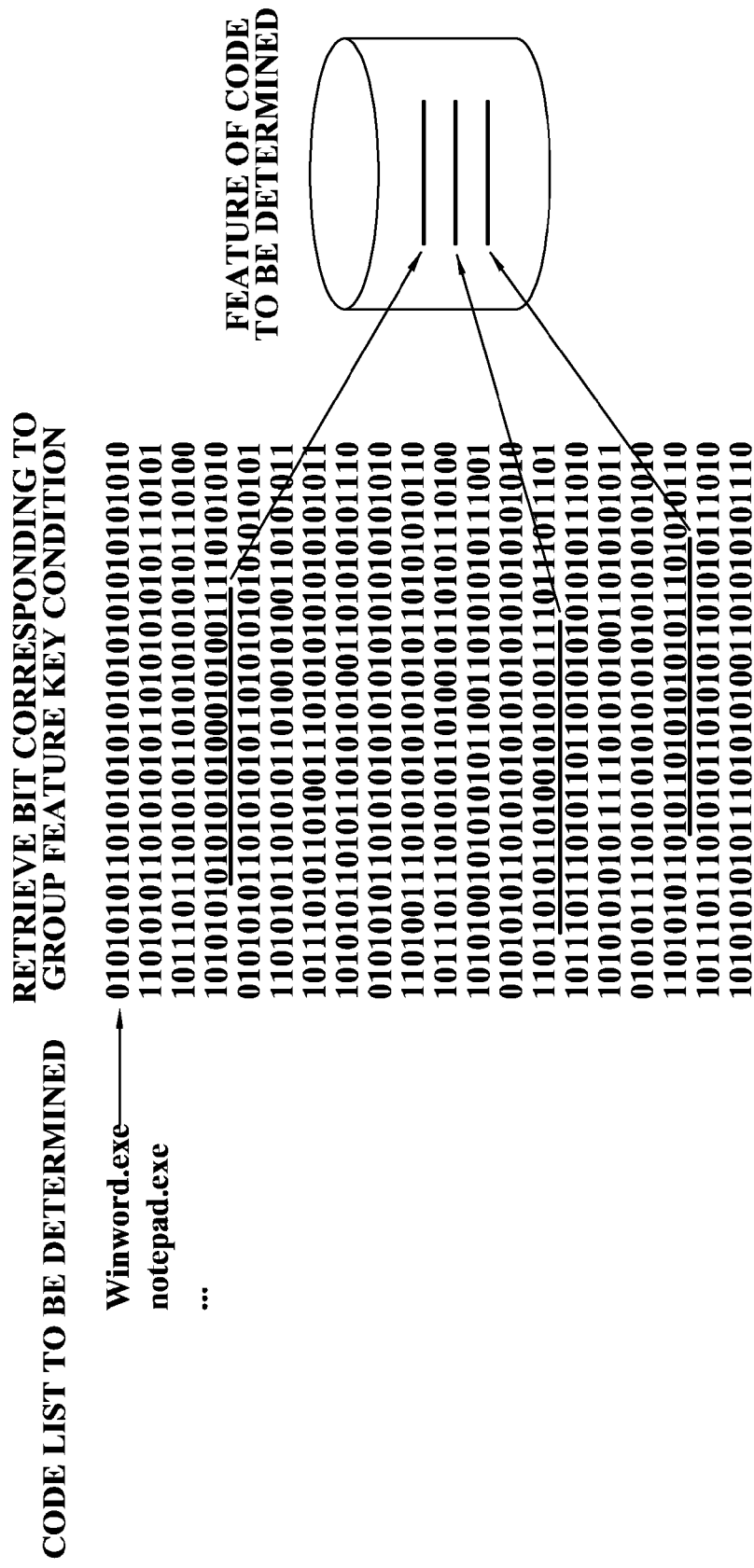
FIG. 7 is a diagram illustrating an example of extracting features from a code list to be determined, which is collected in each computer, according to an exemplary embodiment of the present invention.

FIG. 7 is a diagram illustrating an example of extracting features from a code list to be determined, which is collected in each computer, according to an exemplary embodiment of the present invention.

Each computer collects execution file data stored in a computer, or all data stored in the computer, in a code list to be determined, in order to determine whether the data in the code list corresponds to an intrusion code.

Features are extracted from the collected data, specifically, a code to be determined, which is included in a code list to be determined. Features of the code to be determined may be extracted using a group feature key established in a computer.

A similarity value of the extracted features and features of an immune database is calculated in order to determine whether the code to be determined corresponds to an intrusion code.

Specifically, a similarity value of features extracted from a code to be determined, for example, a first execution file, and features of the immune database is calculated. The calculated similarity value and a threshold value established in a computer are then compared.

The code to be determined is determined as a resident code when all the calculated similarity values are less than or equal to a threshold value. Specifically, the code to be determined is determined as an intrusion code when any of the calculated similarity values is greater than a threshold value.

A process of extracting features from among codes to be determined, calculating a similarity value of the extracted features and features of an immune database, comparing the calculated similarity value and a threshold value, and determining whether data corresponds to an intrusion code is performed with respect to all codes to be determined, which are included in a code list to be determined.

Whether a code to be determined corresponds to an intrusion code may be determined using the above-described process.

Figure 8:
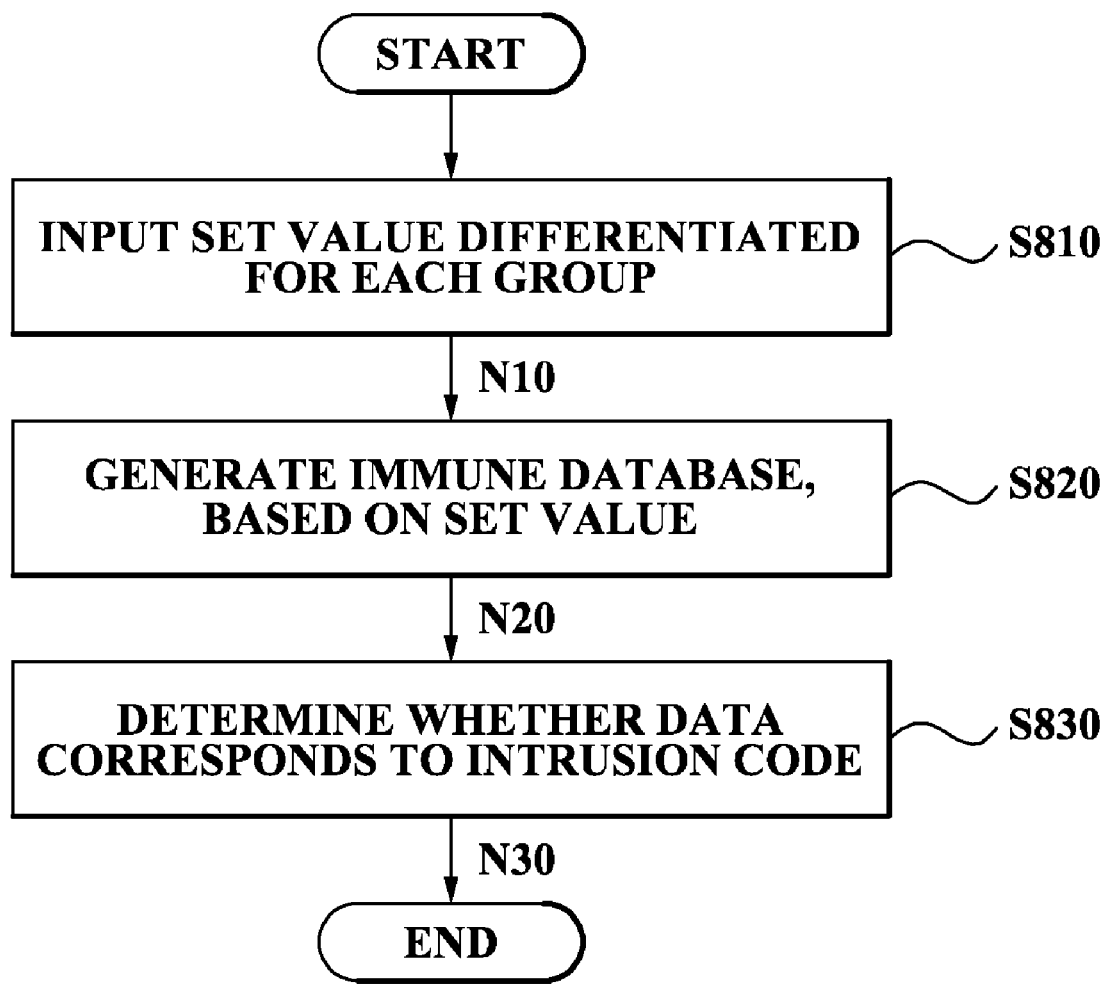
FIG. 8 is a flowchart illustrating operations of a method of detecting an intrusion code according to an exemplary embodiment of the present invention.

FIG. 8 is a flowchart illustrating operations of a method of detecting an intrusion code according to an exemplary embodiment of the present invention.

A method of detecting an intrusion code begins through an input of, in each computer, a set value differentiated for each computer group, in operation S810.

The input set value may correspond to a group feature key differentiated for each computer group, a resident code list, and a random pool generation factor which generates a pool of the immune database.

A group feature key may be used for extracting features of a resident code for generating the immune database, or extracting features of data for determining whether data corresponds to an intrusion code. Specifically, features corresponding to a group feature key condition are extracted from the resident code, and the features corresponding to the group feature key condition are extracted from data for determining whether data corresponds to an intrusion code.

The group feature key may correspond to a pattern which is shown at a predetermined probability, in a file processing a binary file or an original binary execution file.

A resident code list may correspond to a program installed in a computer by a user, or a code list determined as secure from among execution codes.

As described above, since the program and the execution file may be changed on an individual user computer, the resident code list may be differently established to correspond to a feature of each computer.

The random pool generation factor may include a factor which establishes a threshold value and a random pool size. Here, the threshold value is used for generating the immune database or determining the intrusion code using the generated immune database.

When the set value differentiated for each group is input, an immune database is generated, based on the input set value, in operation S820.

Specifically, features corresponding to a group feature key condition are extracted from each resident code included in the resident code list, and random pool features are generated, based on the group feature key and the random pool generation factor.

The random pool features may be generated, based on a length of the group feature key, and a random pool size included in the random pool generation factor.

A similarity value of features of each resident code, and the random pool features is calculated, and features in which the calculated similarity value, from among the random pool features and is less than or equal to a predetermined threshold value, are generated into the immune database.

In operation S830, it is determined whether data corresponds to an intrusion code, based on the generated immune database.

Specifically, it is determined whether the collected data corresponds to an intrusion code, using the immune database. By way of example, but not by way of limitation, collected data may include data included in any of the execution file data stored in a computer, any data stored in the computer, and any data input in real time.

After features corresponding to a group feature key condition are extracted from data in order to determine whether data corresponds to an intrusion code, and a similarity value of features of the extracted data and features of the immune database are calculated, the calculated similarity value and a threshold value are compared.

The data is determined as an intrusion code if the calculated similarity value is greater than a threshold value.

The data is determined as a resident code being a secure code if all the calculated similarity values are less than or equal to a threshold value.

Figure 9:
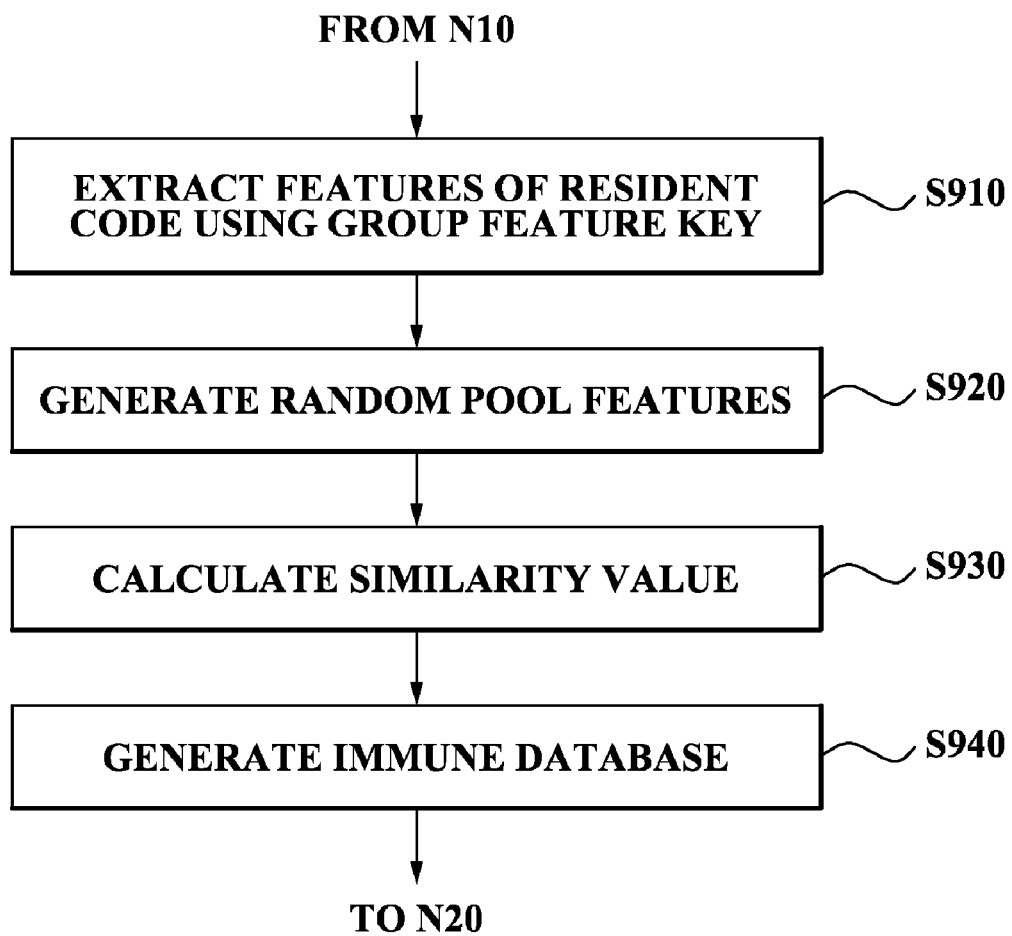
FIG. 9 is a flowchart illustrating detailed operations of generating an immune database, based on a set value, of FIG. 8.

FIG. 9 is a flowchart illustrating detailed operations of operation S820 of FIG. 8

Operation S910 extracts features of the resident code using the input group feature key and the resident code list.

Features corresponding to the group feature key condition may be extracted from each resident code included in the resident code list.

In operation S920, random pool features are generated, based on a length of the group feature key, and a random pool size included in the random pool generation factor.

A number of the random pool features corresponding to a random pool size are randomly generated from among a number of features corresponding to a length of the group feature key.

A similarity value of features of the extracted resident code, and the generated random pool features are calculated in operation S930, in order to generate the immune database.

A similarity value with respect to each feature is calculated with one-to-one correspondence. Accordingly, when features of the resident code are 'N'-number, and the random pool features are 'M'-number, a similarity value is calculated as an N×M-number.

After calculating a similarity value, the immune database is generated by features in which the calculated similarity value from among the random pool features is less than or equal to a predetermined threshold value, in operation S940.

The threshold value may be a threshold value included in the random pool generation factor when inputting a set value.

Figure 10:
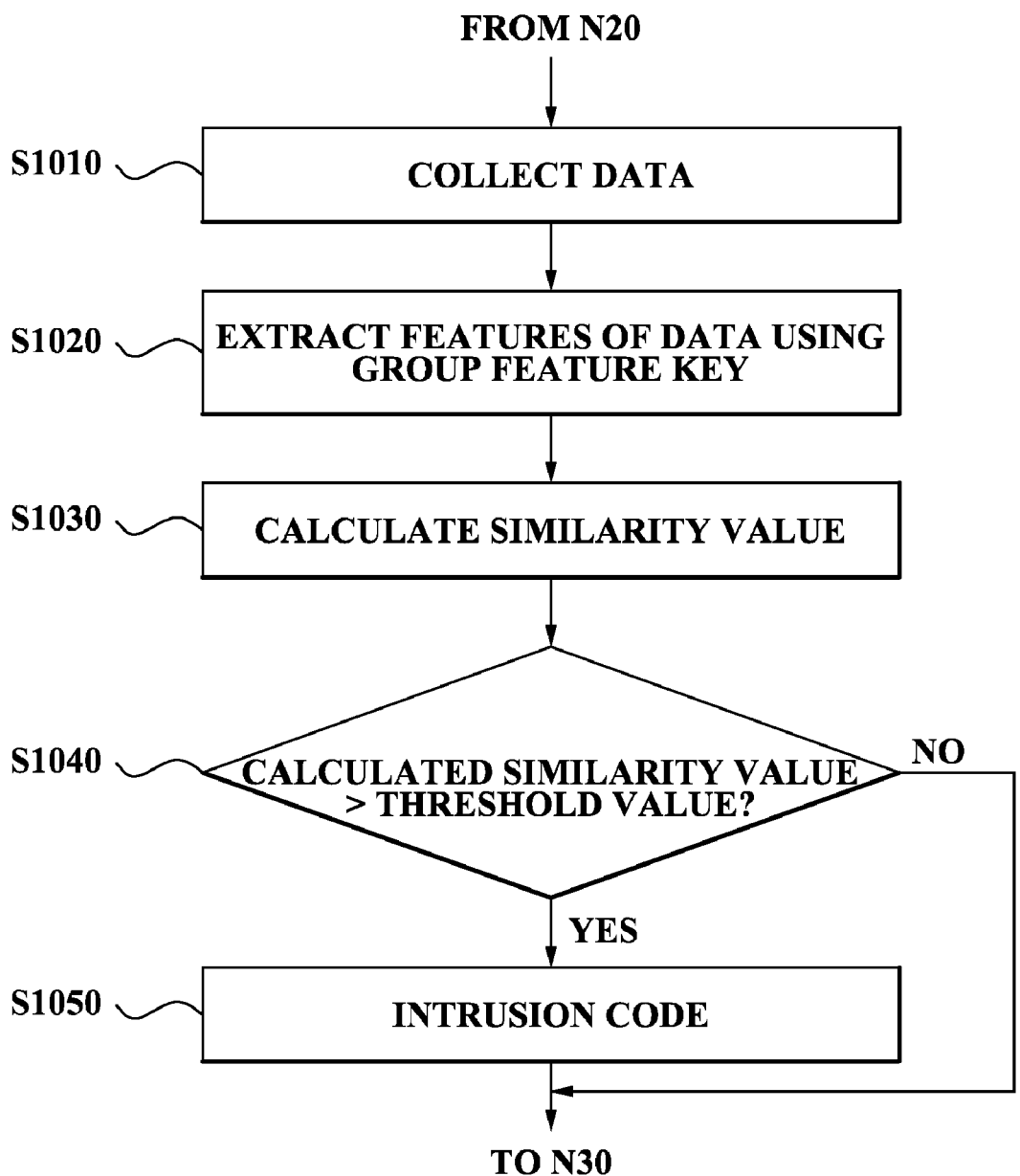
FIG. 10 is a flowchart illustrating detailed operations of determining whether data corresponds to intrusion code, of FIG. 8.

FIG. 10 is a flowchart illustrating detailed operations of operation S830 of FIG. 8.

In operation S1010, data is collected to determine whether the data corresponds to the intrusion code.

The collected data may correspond to data included in any of the execution file data stored in a computer, any data stored in the computer, and any data input into the computer in real time.

The data input into the computer in real time may correspond to a file downloaded using wired/wireless network shares, a file downloaded using an HTTP/FTP, a file downloaded using e-mails, a file downloaded using P2P technology, a file downloaded from a storing apparatus, and the like.

Features corresponding to a group feature key condition are extracted from the collected data, for example, each execution file, in operation S1020.

A similarity value of features extracted from the data, and features of the immune database are calculated in operation S1030.

Specifically, a similarity value of each feature extracted from the data, and each feature of the immune database is calculated.

In operation S1040, it is determined whether the similarity value calculated with respect to the features of the immune database is greater than a predetermined threshold value.

In operation S1050, if it is determined that the calculated similarity value is greater than a threshold value, it is determined that the data is an intrusion code.

Conversely, if the calculated similarity value is less than or equal to a threshold value, the data is determined as a resident code being a secure code.

A method of detecting an intrusion code according to the above-described exemplary embodiments may be recorded in computer-readable media including program instructions to implement various operations embodied by a computer. The media may also include, alone or in combination with the program instructions, data files, data structures, and the like. Examples of computer-readable media include, but are not limited to, magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an exemplary embodiment of the present invention, there may be provided an apparatus and method of detecting an intrusion code, which can differentiate and generate an immune database which can determine whether data corresponds to an intrusion code.

According to an exemplary embodiment of the present invention, there may also be provided an apparatus and method of detecting an intrusion code, which can prevent uniform damage due to a new type or a variety of a malicious code using a differentiated immune database.

According to an exemplary embodiment of the present invention, there may also be provided an apparatus and method of detecting an intrusion code, which can acquire a diagnostics method with respect to a new type or a variety of a malicious code from a system in which tolerance to the new type or the variety of the malicious code is induced.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for detecting an intrusion code, the apparatus comprising:
   a processor:
   a set value input unit in which a set value differentiated for each group, comprising at least one computer, of a plurality of groups is input;
   an immune database generation unit which generates an immune database, differentiated for each group, based on the set value, under control of the processor; and
   an intrusion code determination unit which determines whether target data corresponds to an intrusion code, based on the immune database,
   wherein, in generating the immune database differentiated for each group, the immune database generation unit uses a same method comprising:
      generating random pool features of data based on a length of a group feature key, corresponding to a characteristic of a sequence of a code, and a random pool size; and
      comparing at least one resident code determined to be secure with the random pool features of data to generate the immune database comprising selected random pool features of data which are selected from among the random pool features of data, and
   wherein, in using the same method, the at least one resident code, the length of the group feature key and the random pool size are differentiated for each group.

2. The apparatus of claim 1, wherein the set value comprises:
   the group feature key;
   a resident code list which lists the at least one resident code; and
   a random pool generation factor which is used to generate a pool of the immune database which is differentiated for each group.

3. The apparatus of claim 2, wherein the immune database generation unit comprises:
   a feature extraction unit which extracts features of the at least one resident code using the group feature key;
   a pool feature generation unit which generates the random pool features of data, based on the group feature key and the random pool generation factor;
   a similarity value calculation unit which calculates a similarity value of the features of the at least one resident code and the random pool features of data; and
   an immune database generation management unit which generates the immune database comprising the selected random pool features of data of which the calculated similarity value is less than or equal to a threshold value.

4. The apparatus of claim 3, wherein the threshold value is differentiated for each group.

5. The apparatus of claim 3, wherein the threshold value is set in the random pool generation factor.

6. The apparatus of claim 2, wherein the intrusion code determination unit comprises:
   a data feature extraction unit which extracts features of the target data using the group feature key;
   a data similarity value calculation unit which calculates a similarity value of the features of the target data and at least one data feature included in the immune database; and
   an intrusion code determination management unit which determines the target data as an intrusion code when the calculated similarity value is greater than a predetermined threshold value.

7. The apparatus of claim 6, wherein the intrusion code determination unit further comprises:
   a data collection unit which collects the target data.

8. The apparatus of claim 1, wherein the target data comprises execution file data, data file data, and data input to each group in real time.

9. The apparatus of claim 1, wherein the group feature key corresponds to a pattern of a code which is stored in the at least one computer of each group, the pattern of the code being differentiated for each group, and
   wherein the pattern appears in a data file stored in the at least one computer of each group at a given probability.

10. The apparatus of claim 1, wherein, based on the immune database differentiated for each group, the intrusion code determination unit determines the target data:
   to be the intrusion code for a first group of the plurality of groups; and
   not to be the intrusion coder for a second group of the plurality of groups.

11. A method of detecting an intrusion code using an apparatus comprising a processor, the method comprising:
   inputting a set value differentiated for each group, comprising at least one computer, of a plurality of groups;
   generating, under control of the processor, an immune database differentiated for each group, based on the set value; and determining whether target data corresponds to an intrusion code, based on the immune database, wherein a same method is used in generating the immune database differentiated for each group, the same method comprising:

generating random pool features of data based on a length of a group feature key, corresponding to a characteristic of a sequence of a code, and a random pool size; and comparing at least one resident code determined to be secure with the random pool features of data to generate the immune database comprising selected random pool features of data which are selected from among the random pool features of data, and wherein, in using the same method, the at least one resident code, the length of the group feature key and the random pool size are differentiated for each group.

12. The method of claim 11, wherein the set value comprises:

the group feature key;

a resident code list which lists the at least one resident code; and a random pool generation factor which is used to generate a pool of the immune database which is differentiated for each group.

13. The method of claim 12, wherein the generating the immune database comprises:

extracting features of the at least one resident code using the group feature key;

generating the random pool features of data, based on the group feature key and the random pool generation factor;

calculating a similarity value of the features of the at least one resident code, and the random pool features of data; and generating the immune database comprising the selected random pool features of which the calculated similarity value is less than or equal to a threshold value.

14. The method of claim 13, wherein the threshold value is differentiated for each group.

15. The method of claim 13, wherein the threshold value is set in the random pool generation factor.

16. The method of claim 12, wherein the determining whether the data corresponds to the intrusion code comprises:

extracting features of the target data using the group feature key;

calculating a similarity value of the features of the target data, and at least one data feature included in the immune database; and determining the data as an intrusion code if the calculated similarity value is greater than a threshold value.

17. The method of claim 16, wherein the determining whether the data corresponds to the intrusion code further comprises collecting the target data.

18. The method of claim 11, wherein the target data comprises execution file data, data file data, and data input to each group in real time.

19. The method of claim 11, wherein the group feature key corresponds to a pattern of a code which is stored in the at least one computer of each group, the pattern of the code being differentiated for each group, and wherein the pattern appears in a data file stored in the at least one computer of each group at a given probability.

20. The method of claim 11, wherein, based on the immune database differentiated for each group, the target data determined to be the intrusion code for a first group of the plurality of groups is not determined to be the intrusion coder for a second group of the plurality of groups.

21. A non-transitory computer-readable recording medium storing a program for implementing a method of detecting an intrusion code, the method comprising:

inputting a set value differentiated for each group, comprising at least one computer, of a plurality of groups;

generating an immune database, based on the set value, the immune database being differentiated for each group; and determining whether target data corresponds to an intrusion code, based on the immune database, wherein a same method is used in generating the immune database differentiated for each group, the same method comprising:

generating random pool features of data based on a length of a group feature key, corresponding to a characteristic of a sequence of a code, and a random pool size; and comparing at least one resident code determined to be secure with the random pool features of data to generate the immune database comprising selected random pool features of data which are selected from among the random pool features of data, and wherein, in using the same method, the at least one resident code, the length of the group feature key and the random pool size are differentiated for each group.

* * * * *